(12) United States Patent
Tanaka

(10) Patent No.: US 6,601,993 B2
(45) Date of Patent: Aug. 5, 2003

(54) ROLLING BEARING DEVICE

(75) Inventor: Susumu Tanaka, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/940,609

(22) Filed: Aug. 29, 2001

(65) Prior Publication Data

US 2002/0064326 A1 May 30, 2002

(30) Foreign Application Priority Data

Aug. 29, 2000 (JP) .................................... P. 2000-258326
Jul. 5, 2001 (JP) .................................... P. 2001-205297

(51) Int. Cl.$^7$ .......................... F16C 19/00; F16C 29/00; F16H 25/00
(52) U.S. Cl. ........................................ 384/492; 148/318
(58) Field of Search ................................ 384/492, 625, 384/913; 178/318

(56) References Cited

U.S. PATENT DOCUMENTS

| | | | | |
|---|---|---|---|---|
| 6,086,686 A | * | 7/2000 | Tanaka et al. ............... | 148/325 |
| 6,101,719 A | * | 8/2000 | Kiuchi et al. ............ | 29/898.13 |
| 6,143,425 A | * | 11/2000 | Tanaka et al. ............... | 428/627 |
| 6,224,688 B1 | * | 5/2001 | Takemura et al. .......... | 148/318 |
| 6,238,455 B1 | * | 5/2001 | Brown et al. .................. | 75/243 |
| 6,315,455 B1 | * | 11/2001 | Tanaka et al. ............... | 384/492 |
| 6,342,109 B1 | * | 1/2002 | Takemura et al. .......... | 148/319 |

* cited by examiner

Primary Examiner—Christopher P. Schwartz
(74) Attorney, Agent, or Firm—Sughrue Mion, PLLC

(57) ABSTRACT

In a rolling bearing 1 comprising an outer ring 2, an inner ring 3, and a plurality of rolling elements 4 rollably provided interposed between the outer ring 2 and the inner ring 3, the outer ring 2 and the inner ring 3 are formed by an austenite-based stainless steel. Further, the outer ring 2 and the inner ring 3 are subjected to plastication attaining a percent area reduction of equal or more than 25% to have a surface hardness HRC of equal or more than 35.

12 Claims, 7 Drawing Sheets

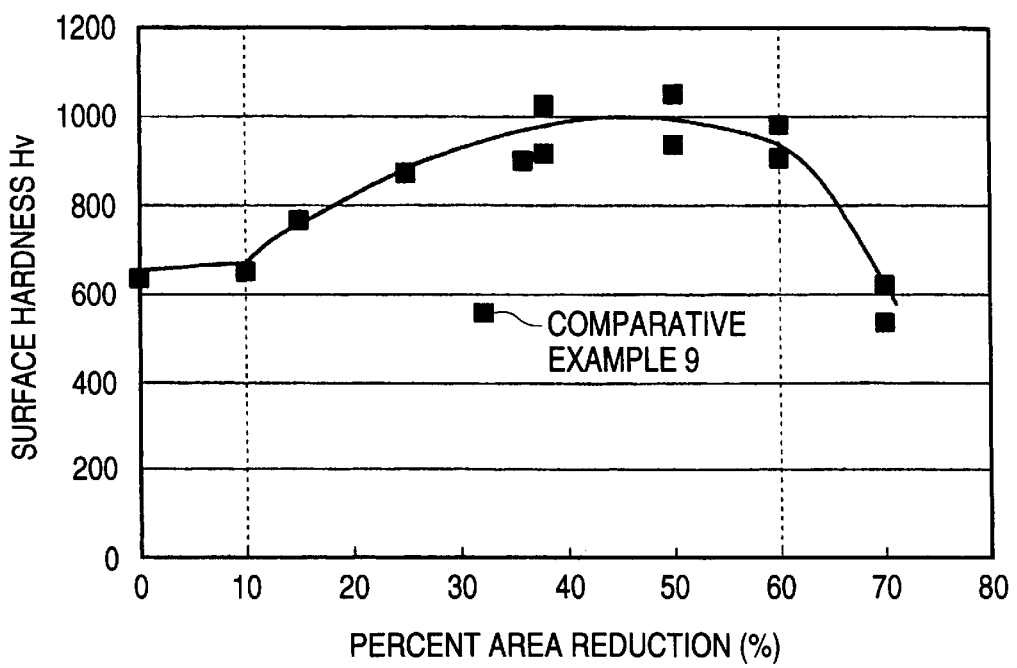
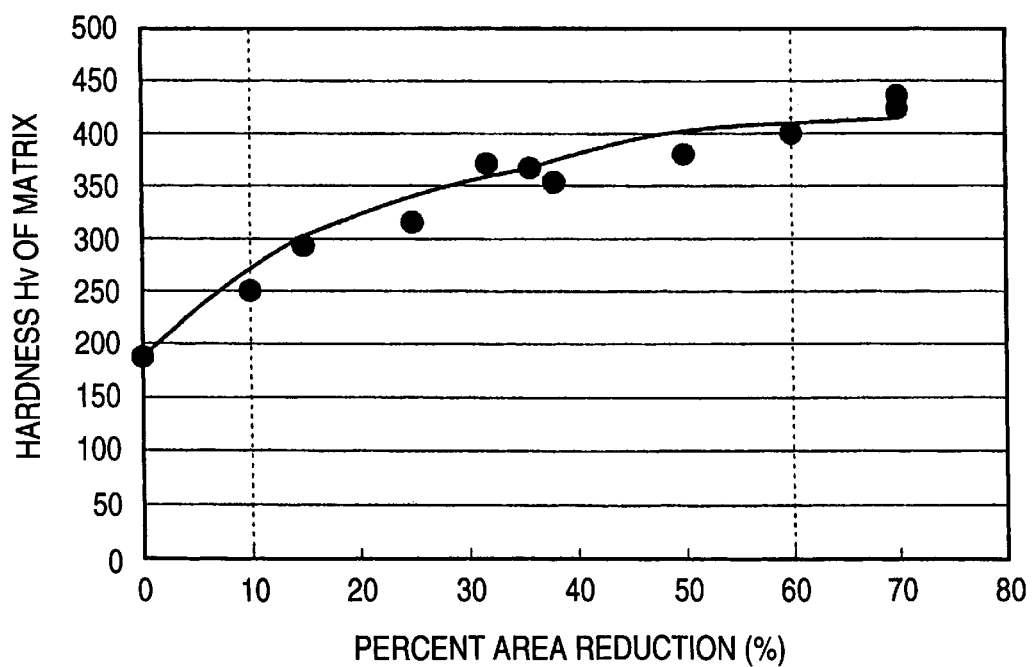

ROLLING BEARING DEVICE

BACKGROUND OF THE INVENTION

1. Field of the Invention

The present invention relates to a rolling bearing device such as rolling bearing, linear guide and ball thread and particularly to a rolling bearing device having an excellent corrosion resistance and durability which can be used also in usage requiring non-magnetic properties.

2. Description of the Related Art

In general, a rolling bearing device such as rolling bearing, linear guide and ball thread makes a rolling movement by the external member, internal member and rolling elements constituting the rolling bearing device. Thus, the external member, internal member and rolling elements are repeatedly subjected to contact stress. Therefore, the material constituting these members is required to be hard, withstand load and exhibit a prolonged rolling fatigue life and a good abrasion resistance against slippage.

Therefore, as the material constituting these members there is normally often used SUJ2 of JIS as bearing steel, SUS440C of JIS or 13Cr martensite-based stainless steel as stainless steel or steel corresponding to SCR420 or SCM420 of JIS as case-hardened steel.

These materials are repeatedly subject to shearing stress under a high face pressure. In order to obtain required physical properties such as resistance to shearing stress and prolonged rolling fatigue life, bearing steel is subjected to hardening and tempering to have a surface hardness of HRC of from 58 to 64before use. Case-hardened steel is subjected to carburizing or carbonitriding followed by hardening and tempering to have a surface hardness of HRC of from 58 to 64 before use.

On the other hand, an apparatus utilizing magnetic field or apparatus, which shows a drop in measuring accuracy under the influence of magnetic field such as semiconductor producing machine, liquid crystal producing machine, apparatus utilizing electron rays, medical inspection apparatus and linear motor car, is subject to disturbance of ambient magnetic field when driven by rotation or the like or inhibition of smooth driving if the driving portion is formed by a magnetic material. Therefore, a rolling bearing device for use in the foregoing purposes needs to be formed by a non-magnetic material.

A rolling bearing device is used in various atmospheres. For example, the rolling bearing device to be used in a corrosive atmosphere as in facilities for the production of liquid crystal and semiconductor or food machine is required to have an excellent corrosion resistance. However, when the rolling bearing device to be used in such a corrosive atmosphere is formed by the foregoing bearing steel, the resulting rolling bearing device runs short of corrosion resistance and thus early undergoes rusting or elution to end its life. Accordingly, the rolling bearing device to be used in the foregoing corrosive atmosphere is often formed by stainless steel, which is excellent in corrosion resistance.

Stainless steels are roughly divided into five groups, i.e., austenite-based stainless steel, ferrite-based stainless steel, austenite-ferrite binary stainless steel, martensite-based stainless steel, precipitation hardening stainless steel. A rolling bearing device is subject to great shearing stress or abrasion at the contact site of the external member or internal member with the rolling elements. Therefore, the rolling bearing device is mainly made of martensite-based stainless steel, which is hard and excellent in abrasion resistance. SUS440C, which is hardest in these martensite-based stainless steels, is often used. However, martensite-based stainless steel such as SUS440C has a deteriorated corrosion resistance as compared with other stainless steels and thus is not necessarily on a satisfactory level for use in a corrosive atmosphere.

On the other hand, austenite-based stainless steel, ferrite-based stainless steel, etc. are excellent in corrosion resistance but do not have sufficient hardness required for rolling bearing device and thus sometimes leave something to be desired in durability such as abrasion resistance and rolling fatigue life.

Therefore, in the case where sufficient corrosion resistance is required, martensite-based stainless steel or case-hardened steel to be used is subjected to carburizing or carbonitriding, and then plated with hard Cr or coated with raydent fluoride or other various corrosion-resistant films to have an improved corrosion resistance. However, since the coating film which has been deposited discontinuously to the base metal can easily come off, the resulting rolling bearing device can leave something to be desired in corrosion resistance when used in a corrosive atmosphere.

On the other hand, as the non-magnetic material there has heretofore been normally used a beryllium-copper alloy, ceramic or the like. However, the beryllium-copper alloy can be easily oxidized, and its oxidation product is harmful. Thus, the use of the beryllium-copper alloy has become more and more difficult. Further, since the beryllium-copper alloy has a hardness HRC as low as 40, the resulting rolling bearing device leaves something to be desired in durability.

Ceramic is disadvantageous in that it is very expensive and can be very hardly produced in a large-sized or thin form.

Therefore, in recent years, with the yearly growing demand for higher quality and reliability, Mn—Cr—V or Mn—Cr—Ni—V precipitation hardening austenite non-magnetic steel has been used more and more as a non-magnetic material substitute for beryllium-copper alloy or ceramic. However, these materials can be very difficultly worked and thus require a high degree working technique. In addition to these disadvantages, these materials are disadvantageous in that they attain a hardness HRC of about 45 at maximum and leave something to be desired in corrosion resistance.

SUMMARY OF THE INVENTION

It is therefore an object of the present invention to solve the foregoing problems with the conventional rolling bearing device and provide a rolling bearing device excellent in both corrosion resistance and durability which can be used also in usage requiring non-magnetic properties.

Paying their attention to austenite-based stainless steel, which is particularly excellent in corrosion resistance and undergoes work hardening when subjected to plastication such as cold working, among the foregoing stainless steels, the inventors made extensive studies to find a rolling bearing device which satisfies requirements for both corrosion resistance and durability and thus can be used in a corrosive atmosphere and also in usage requiring non-magnetic properties.

As a result, it was found that when reduction working (plastication) attaining a percent area reduction of equal or more than 25% is conducted so that the constituent members made of austenite-based stainless steel undergo work hardening to have a surface hardness HRC of equal or more than 35 at an intermediate step during the working of predetermined austenite-based stainless steel into desired shape to prepare constituent members of rolling bearing device such as external member and internal member, the resulting rolling bearing device can be secured with sufficient durability as well as with drastically improved corrosion resistance as compared with those made of the conventional martensite-based stainless steel.

The rolling bearing device according to the invention comprises an external member, an internal member, and a plurality of rolling elements rollably provided interposed between the external member and the internal member, wherein at least one of the external member and the internal member is formed by an austenite-based stainless steel and has a surface having a hardness HRC of equal or more than 35 formed by plastication that attains a percent area reduction of equal or more than 25%.

A rolling bearing device comprising members having the foregoing arrangement exhibits an extremely high surface hardness and hence an excellent durability. Further, since these members are formed by an austenite-based stainless steel, the resulting rolling bearing device exhibits an excellent corrosion resistance, thus can be used in a corrosive atmosphere, and also in usage requiring non-magnetic properties.

The term "percent area reduction" as used herein is meant to indicate an index indicating how much the sectional area of the constituent members of rolling bearing device such as external member and internal member decreases when subjected to plastication such as rolling and drawing. This index is defined by the following equation (1):

$$\text{Percent area reduction} = (A_0-A)/A_0 \times 100 \ (\%) \quad (1)$$

wherein $A_0$ represents the sectional area of unplasticated constituent member and $A$ represents the sectional area of plasticated constituent member.

For the calculation of percent area reduction, the sectional area of various constituent members can be used. For example, in the case where the rolling bearing device is a rolling bearing, the area of the section of outer ring and inner ring contained in the plane including the axial line of the rolling bearing may be used. This substantially applies to the case where the rolling bearing device is a ball thread or linear guide.

Examples of the rolling bearing device of the invention include rolling bearing, ball thread, and linear guide (direct-acting guide bearing) and the like.

The term "external member" as used herein is meant to indicate the outer ring if the rolling bearing device is a rolling bearing. If the rolling bearing device is a linear guide, the term "external" is meant to indicate the slider. Similarly, if the rolling bearing device is a ball thread, the term "external member" is meant to indicate the nut. The term "internal member" as used herein is meant to indicate the inner ring if the rolling bearing device is a rolling bearing. If the rolling bearing device is a linear guide, the term "external" is meant to indicate the guide rail. Similarly, if the rolling bearing device is a ball thread, the term "external member" is meant to indicate the thread axis.

The critical significance of the invention will be described hereinafter.

As the material constituting at least one of the foregoing external member and internal member there is used an austenite-based stainless steel as previously mentioned. In the invention, however, the austenite-based stainless steel having the formulation described below is preferred.

(Content of S)

In general, S (sulfur) occurs in steel in the form of MnS. MnS acts to improve the scrapability of steel and is often used positively. For example, in recent years, stainless steel has been used more and more for the purpose of enhancing the reliability of devices. However, stainless steel normally can hardly be scraped. Accordingly, an easily scarapable stainless steel having S incorporated therein singly or in composite with Se, Te, Pb, etc. has been noted from the standpoint of cost reduction.

However, MnS is regarded as an A-based inclusion in JIS and thus forms a linear defect. When the stainless steel is subject to tensile stress or shearing stress developed by plastication, MnS becomes a stress concentration source that lowers the limit of break of member.

Further, in the case where the stainless steel is used as a rolling bearing device, MnS is harmful to durability or corrosion resistance. In particular, stainless steel which has been subjected to plastication that attains a high percent area reduction is disadvantageous in that it exhibits a drastically deteriorated corrosion resistance.

Therefore, the content of S in austenite-based stainless steel is preferably equal or less than 0.030%. In order to further inhibit the deterioration of durability or corrosion resistance, the content of S in austenite-based stainless steel is more preferably equal or less than 0.020%.

When the content of S is suppressed, the resulting austenite-based stainless steel exhibits a deteriorated scrapability. However, scrapability is not a particular requirement for the invention because one of the objects of the invention is to accomplish the precision forming of the constituent members of rolling bearing device (external member and internal member) directly by reduction working.

(Content of Other Alloy Components, Surface Hardness, and Percent Area Reduction)

An austenite-based stainless steel undergoes work-hardening by intensification of dislocation, induced transformation to martensite, etc. Thus, when subjected to intense plastication attaining a percent area reduction of equal or more than 25% to have a surface hardness HRC of equal or more than 35, the austenite-based stainless steel can be secured with durability required for rolling bearing device. In order to secure higher durability, the surface hardness HRC of the austenite-based stainless steel is preferably equal or more than 38.

However, when an austenite-based stainless steel is subjected to intense plastication attaining a percent area reduction of equal or more than 25%, excessive induced transformation causes the production of martensite structure that deteriorates corrosion resistance, occasionally making it impossible to attain both desired durability and corrosion resistance which are objects of the invention. In order to inhibit these defects, it is necessary to use an austenite-based stainless steel having the formulation satisfying the following relationship (2):

$$\text{Eq. 1} + 0.79 \times \text{Eq. 2} \geq 27.0 \quad (2)$$

In the foregoing relationship, Eq. 1 and Eq. 2 are defined by the following equations (3) and (4), respectively, and calculated from the content (% by mass) of various alloy components (C, N, Ni, Cr, Mn, Cu, Si, Mo) contained in the austenite-based stainless steel. Eq. 1 and Eq. 2 each indicate the formulation of austenite-based stainless steel. Eq. 1 is called Ni equivalent, and Eq. 2 is called Cr equivalent.

$$\text{Eq. 1} = \text{Ni \%} + 0.5 \times \text{Mn \%} + 0.3 \times \text{Cu \%} + 25 \times \text{N \%} + 30 \times \text{C \%} \quad (3)$$

$$\text{Eq. 2} = \text{Cr \%} + 2 \times \text{Si \%} + 1.5 \times \text{Mo \%} \quad (4)$$

In the relationship (2), the value of the left side (Eq. 1+0.79×Eq. 2) is equal or more than 27. In order to further inhibit the production of martensite structure, the value of the left side of the relationship (2) is preferably equal or more than 28.0, more preferably equal or more than 30.0.

The value of Eq. 2 is preferably equal or less than 28.0 taking into account cost. The value of Eq. 1 is preferably equal or less than 25.0 taking into account the fact that N, which is inexpensive, can be an element substitute for Ni, which is expensive. When these values (Eq. 1 and Eq. 2) are substituted in the relationship (2), the value of the left side of the relationship (2) is from equal or more than 27.0 to equal or less than 47.1.

Further, even if these conditions are satisfied, when the percent area reduction exceeds 80%, excessive induced transformation occurs to cause martensite structure to appear, occasionally deteriorating corrosion resistance. Thus, the percent area reduction is preferably equal or less than 80%.

The austenite-based stainless steel to be used as base metal of constituent members of rolling bearing device is preferably subjected to solution treatment as much as possible from the standpoint of corrosion resistance and work-hardenability.

Reduction working (plastication) can be accomplished by CRF working if the rolling bearing device is a rolling bearing or by rolling or drawing if the rolling bearing device is a ball thread or linear guide.

The rolling element is seldom subject to corrosion because it is retained by the internal member and the external member and protected by a grease, lubricant or the like. Thus, the rolling element may be formed by martensite-based stainless steel. However, the rolling element is preferably formed by ceramics from the standpoint of inhibition of abrasion.

BRIEF DESCRIPTION OF THE DRAWINGS

FIG. 8 is a graph illustrating the relationship between the percent area reduction attained by CRF working and surface hardness; and FIG. 9 is a graph illustrating the relationship between the percent area reduction attained by CRF working and the hardness of base metal.

DETAILED DESCRIPTION OF THE PREFERRED EMBODIMENT

Embodiments of implication of the rolling bearing device according to the invention will be further described in connection with the attached drawings.

[First Embodiment]

Figure 1:
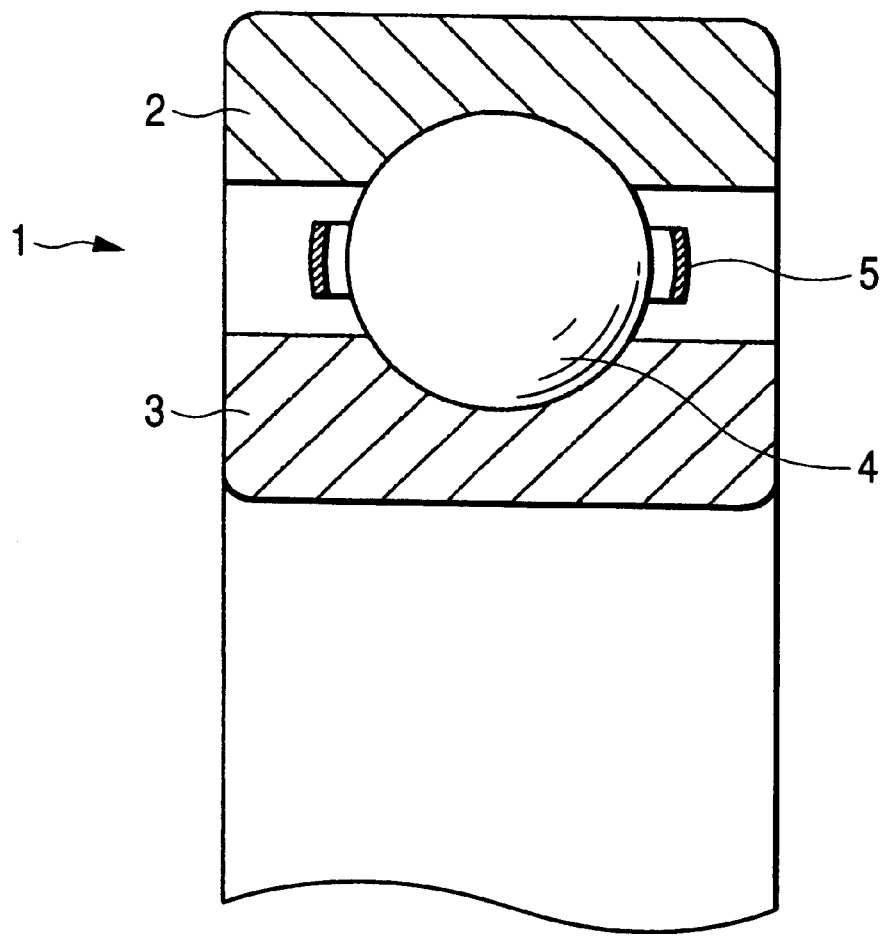
FIG. 1 is a partial vertical sectional view of a rolling bearing which is a first embodiment of the rolling bearing device according to the invention.

FIG. 1 is a partial vertical sectional view of a rolling bearing which is an embodiment of the rolling bearing device according to the invention. The rolling bearing 1 comprises an outer ring 2, an inner ring 3, a plurality of rolling elements 4 rollably provided interposed between the outer ring 2 and the inner ring 3, and a retainer 5 for equally retaining the rolling elements. The outer ring 2 and the inner ring 3 are each formed by SUS304, which is an austenite-based stainless steel. Further, the outer ring 2 and the inner ring 3 each have been prepared by plastication attaining a percent area reduction of equal or more than 25%. In this manner, the outer ring 2 and the inner ring 3 has been work-hardened to have a surface hardness HRC of equal or more than 35.

The rolling bearing 1 comprises the outer ring 2 and the inner ring 3 formed by an austenite-based stainless steel and thus exhibits an excellent corrosion resistance and can be used fairly even in a corrosive atmosphere. Further, since the outer ring 2 and the inner ring 3 each have a surface hardness HRC of equal or more than 35, the rolling bearing 1 exhibits an excellent durability.

The results of evaluation of the relationship between the various elements and the durability and corrosion resistance on various test specimens made of different kinds of stainless steel and having different percentages of area reduction developed by plastication and different surface hardnesses will be described hereinafter.

The kinds of stainless steel used are A-1 to A-5 and B-1 to B-3 as set forth in Table 1. Table 1 gives the content of S in the various steels, and the value of the left side of the foregoing relationship (2), Eq. 1 and Eq. 2. A-1 to A-5 are austenite-based stainless steels satisfying the conditions of the foregoing relationship and equations. B-1 and B-2 are austenite-based stainless steels which do not satisfy these conditions. B-3 is a conventional martensite-based stainless steel (SUS440C).

TABLE 1

| No. | Kind of steel | S content (wt-%) | Eq. 1[2] | Eq. 2[3] | Value of left side of relationship (2)[1] | Remarks |
|---|---|---|---|---|---|---|
| A-1 | SUS304 | 0.018 | 11.6 | 19.8 | 27.2 | Austenite-based stainless steel |
| A-2 | SUS316 | 0.019 | 12.6 | 19.9 | 28.3 | Austenite-based stainless steel |
| A-3 | SUS316 | 0.017 | 14.1 | 21.6 | 31.1 | Austenite-based stainless steel |
| A-4 | SUS316L | 0.018 | 15.1 | 21.5 | 32.0 | Austenite-based stainless steel |
| A-5 | SUS317 | 0.018 | 16.9 | 25.2 | 36.8 | Austenite-based stainless steel |

TABLE 1-continued

| No. | Kind of steel | S content (wt-%) | Eq. 1[2] | Eq. 2[3] | Value of left side of relationship (2)[1] | Remarks |
|---|---|---|---|---|---|---|
| B-1 | SUS304 | 0.019 | 10.7 | 18.9 | 25.6 | Austenite-based stainless steel |
| B-2 | SUS303 | 0.170 | 11.6 | 18.7 | 26.4 | Austenite-based stainless steel |
| B-3 | SUS440C | 0.017 | 31.9 | 18.3 | 46.4 | Martensite-based stainless steel |

[1] Eq. 1 + 0.79 × Eq. 2
[2] Eq. 1 = Ni% + 0.5 × Mn% + 0.3 × Cu% + 25 × N% + 30 × C%
[3] Eq. 2 = Cr% + 2 × Si% + 1.5 × Mo

All the kinds of steels except B-3 were then roll-forged under the following conditions so that they were reduction-worked to various percentages of area reduction. The percent area reduction was determined by measuring the sectional area of the test specimen before and after working, and then substituting the measurements in the foregoing definition equation (1) for percent area reduction.
(Working Conditions)

Size of test specimen: 62 mm wide×100 mm long×15 mm high

Figure 2:
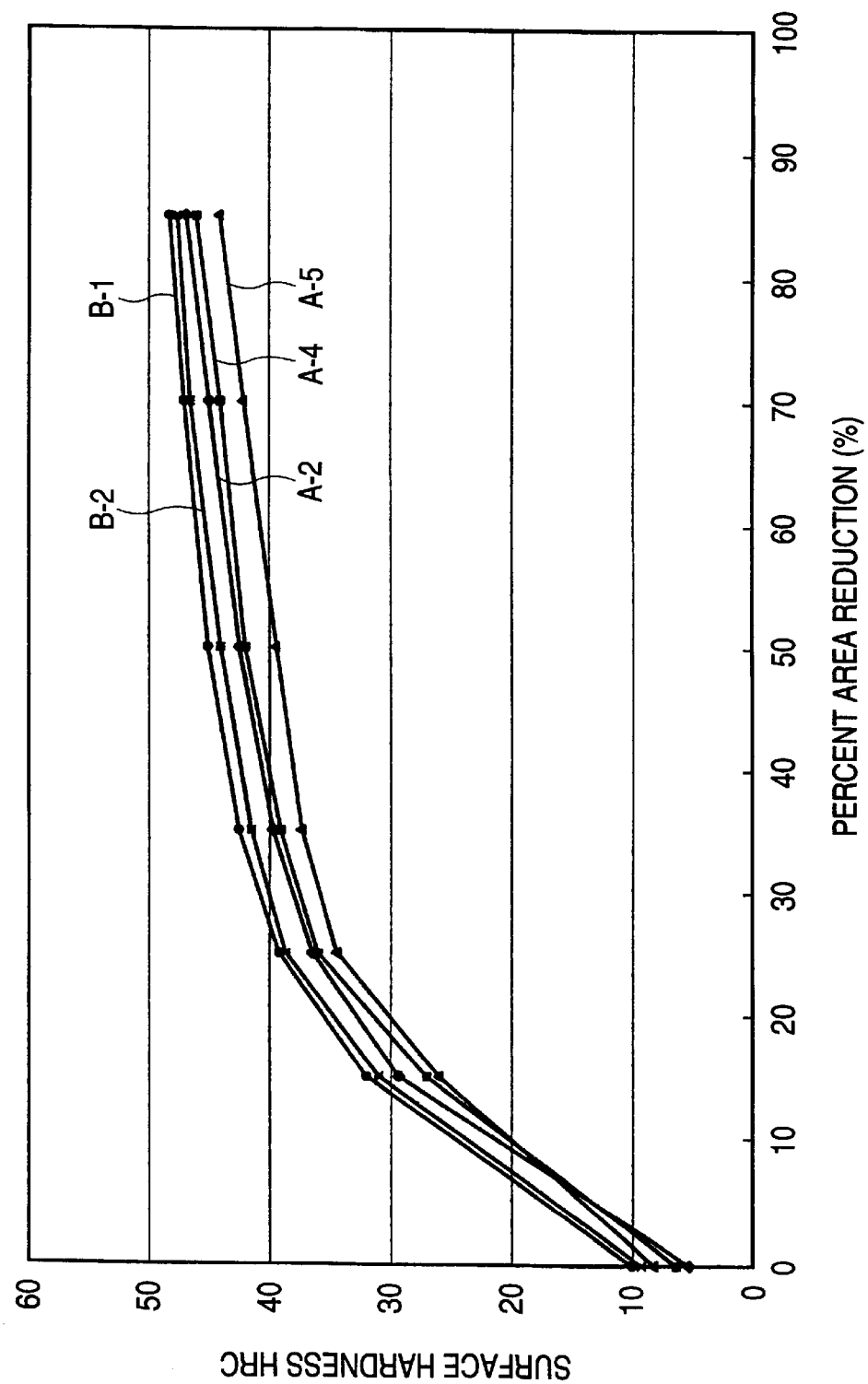
FIG. 2 is a graph illustrating the relationship between percent area reduction attained by plastication and surface hardness.

Circumferential speed of roll: 3.0 m/s
Percent area reduction: 15%, 25%, 35%, 50%, 70%, 85%
When subjected to reduction working, the test specimen changes in its surface hardness. The relationship between the percent area reduction and the surface hardness is shown in FIG. 2. All the kinds of steels were found to have a remarkable rise of surface hardness by reduction working. It is made obvious that when the percent area reduction is equal or more than 25%, a surface hardness HRC of equal or more than 35 can be obtained.

Among the foregoing test specimens, those having a percent area reduction of from 0% to 70% were then subjected to electrical discharge machining and grinding to prepare disc test specimens having a diameter φ of 60 mm. These disc test specimens were each then subjected to thrust rolling durability test under the following conditions. For the evaluation of durability, the time required until the oscillation measured by an acceleration pickup reaches twice the initial value is defined as life.
(Conditions of Thrust Rolling Durability Test)

Load: 490 N

Rotary speed: 1,000 rpm

Lubricant: #68 turbine oil (68 cSt/40° C.)

Figure 3:
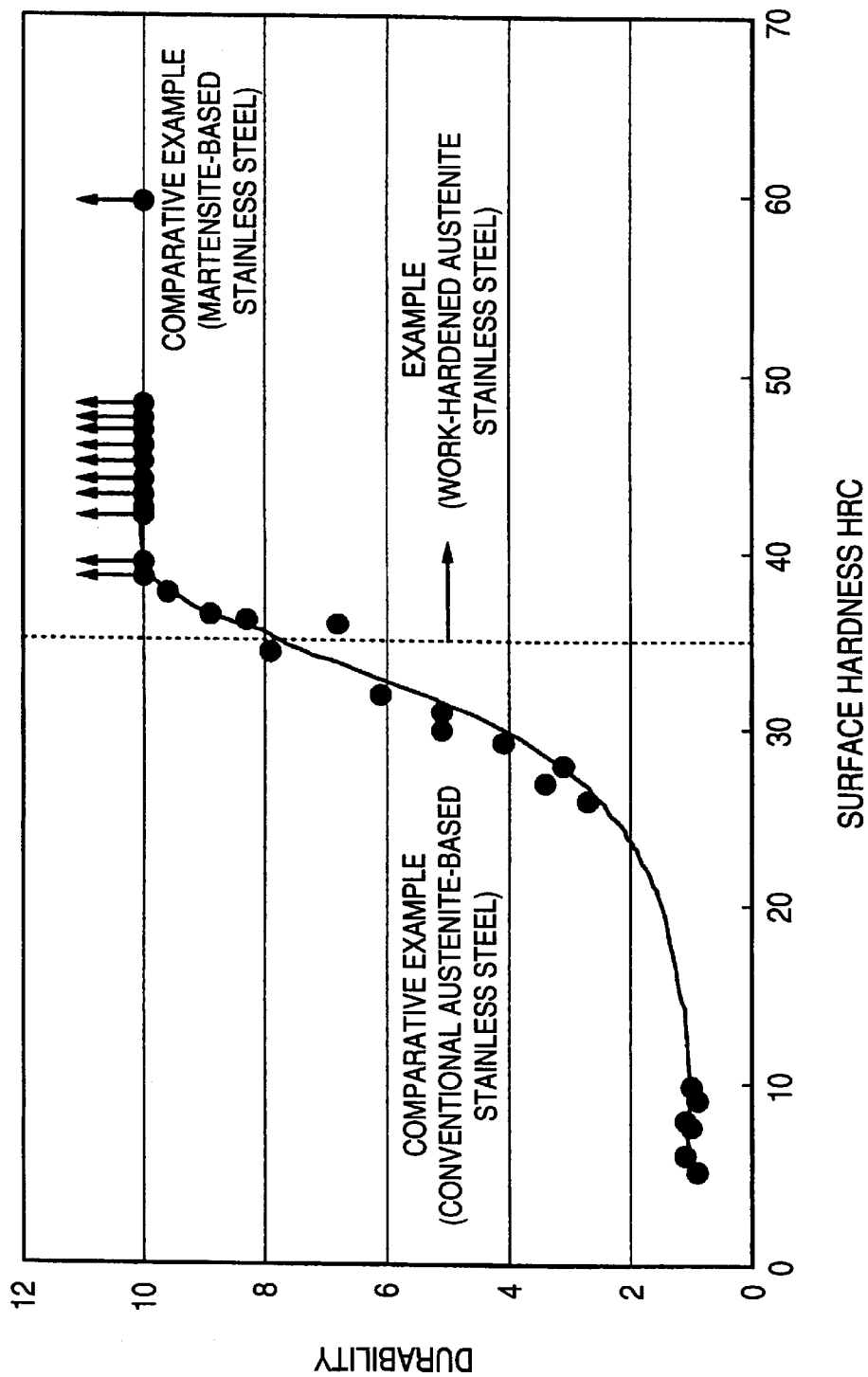
FIG. 3 is a graph illustrating the relationship between surface hardness and durability.

FIG. 3 and Table 2 give the results of the test. The symbol indicating the kind of steel shown in Table 2 is the same as that shown in Table 1. For the evaluation of durability, life is represented relative to that of Comparative Example 1 as 1. When 10 times the life of Comparative Example 1 were reached, the thrust rolling durability test was terminated.

TABLE 2

| | Kind of steel | | | | |
|---|---|---|---|---|---|
| Example No. | Symbol | Value of left side of relation-ship (2)[1] | Surface hardness HRC | Durability | Salt spray | Chemical resistance |
| Example 1 | A-1 | 27.2 | 40.6 | 10.0 | E | 1.2 to 1.4 |
| Example 2 | A-1 | 27.2 | 43.2 | 10.0 | E | 1.5 to 1.6 |
| Example 3 | A-2 | 28.3 | 39.7 | 10.0 | E | 0.4 to 0.6 |
| Example 4 | A-2 | 28.3 | 42.5 | 10.0 | E | 0.5 to 1.0 |
| Example 5 | A-3 | 31.1 | 39.3 | 10.0 | E | 0.4 |
| Example 6 | A-3 | 31.1 | 42.2 | 10.0 | E | 0.4 to 0.5 |
| Example 7 | A-4 | 32.0 | 39.0 | 10.0 | E | 0.3 |
| Example 8 | A-4 | 32.0 | 42.0 | 10.0 | E | 0.3 to 0.4 |
| Example 9 | A-5 | 36.8 | 37.7 | 9.0 | E | 0.3 |
| Example 10 | A-5 | 36.8 | 39.4 | 10.0 | E | 0.3 to 0.3 |
| Comparative Example 1 | B-1 | 25.6 | 10.0 | 1.0 | E | 1.0 |
| Comparative Example 2 | B-2 | 26.4 | 9.2 | 0.9 | F | — |
| Comparative Example 3 | B-1 | 25.6 | 42.5 | 10.0 | G | 1.7 to 2.1 |
| Comparative Example 4 | B-1 | 25.6 | 45.1 | 10.0 | F | 2.4 to 3.1 |
| Comparative Example 5 | B-2 | 26.4 | 41.5 | — | P | — |
| Comparative Example 6 | B-3 | 46.4 | 59.6 | 10.0 | P | 1.5 to 55.0 |
| Comparative Example 7 | B-1 | 25.6 | 32.0 | 6.1 | G | 1.1 to 1.5 |
| Comparative Example 8 | A-2 | 28.3 | 29.3 | 4.1 | E | 0.4 to 0.5 |

[1] Eq. 1 + 0.79 × Eq. 2
[2] Eq. 1 = Ni% + 0.5 × Mn% + 0.3 × Cu% + 25 × N% + 30 × C%
[3] Eq. 2 = Cr% + 2 × Si% + 1.5 × Mo%

As can be seen in FIG. 3, when subjected to work-hardening to have a surface hardness HRC of equal or more than 35, an austenite-based stainless steel exhibits a drastically enhanced durability. In particular, when HRC is equal or more than 38, all the test specimens exhibit a life of 10 times that of Comparative Example 1.

As can be seen in Table 2, the various examples exhibit higher durability than the comparative examples. The test specimens of Comparative Examples 1 and 2 are formed by an austenite-based stainless steel which do not satisfy the foregoing conditions and have a low surface hardness. These comparative examples exhibit a drastically deteriorated durability as compared with the various examples. The test specimens of Comparative Examples 7 and 8 have a surface hardness HRC of lower than 35 and exhibit a slightly enhanced durability. These comparative examples exhibit a poorer durability than the various examples.

The results of evaluation of corrosion resistance will be described hereinafter. For the evaluation of corrosion resistance, a test for evaluating chemical resistance to acid (5N sulfuric acid dipping test and 5N hydrochloric acid dipping test) was conducted in addition to salt spray test. This is because the recent market considers not only corrosion resistance in aqueous or wetting atmosphere but also chemical resistance to acid important since various acids are occasionally used in a corrosive atmosphere where facilities for the production of liquid crystal and semiconductor (cleaning apparatus) or food machines are used.

The salt spray test was conducted according to JIS Z 2371. In some detail, the disc test specimen having a diameter $\phi$ of 60 mm was sprayed with a 5% aqueous solution of sodium chloride at a temperature of 35° C. for 48 hours. For evaluation, those showing no rusting were indicated by E (excellent), those showing some but relatively light rusting were indicated by G (good), those showing definite rusting were indicated by F (fair), and those showing remarkable rusting on substantially entire surface thereof were indicated by P (poor) in Table 2.

As can be seen in Table 2, the various examples exhibit an extremely excellent corrosion resistance (results of salt spray test). On the contrary, Comparative Examples 3 and 4 satisfy the requirements that the surface hardness HRC be equal or more than 35 but do not satisfy the requirements tat the value of the left side of the relationship (2) be equal or more than 27.0. These comparative examples gave slightly poor results of salt spray test as compared with the various examples.

Further, Comparative Example 5 comprised a steel having S incorporated therein in an amount of 0.17% to have a good scrapability and satisfies the requirements that the surface hardness HRC be equal or more than 35. Comparative Example 5 was found to show rusting on the entire surface thereof and hence give remarkably poor results of salt spray test. Moreover, Comparative Example 6 was an example with conventional martensite-based stainless steel. Since the conventional martensite-based stainless steel exhibits a poorer corrosion resistance than the foregoing austenite-based stainless steel, Comparative Example 6 showed remarkable rusting.

For the test for evaluating chemical resistance (5N sulfuric acid dipping test and 5N hydrochloric acid dipping test), a 10 mm×10 mm square test specimen (thickness: 3 mm) was sampled out of the foregoing disc test specimens. These test specimens were each then dipped in 50 ml of 5N sulfuric acid solution and 5N hydrochloric acid solution for 20 hours. The weight of corrosion after dipping (weight of loss by corrosion) was then measured. The measurements were then substituted in the following equation to calculate corrosion rate which is then evaluated for chemical resistance.

Corrosion rate $(g/mm^{2 \cdot hr})$=Corroded weight $(g)$/(Surface area of specimen $(mm^2)$×dipping time (hr))

Figure 4:
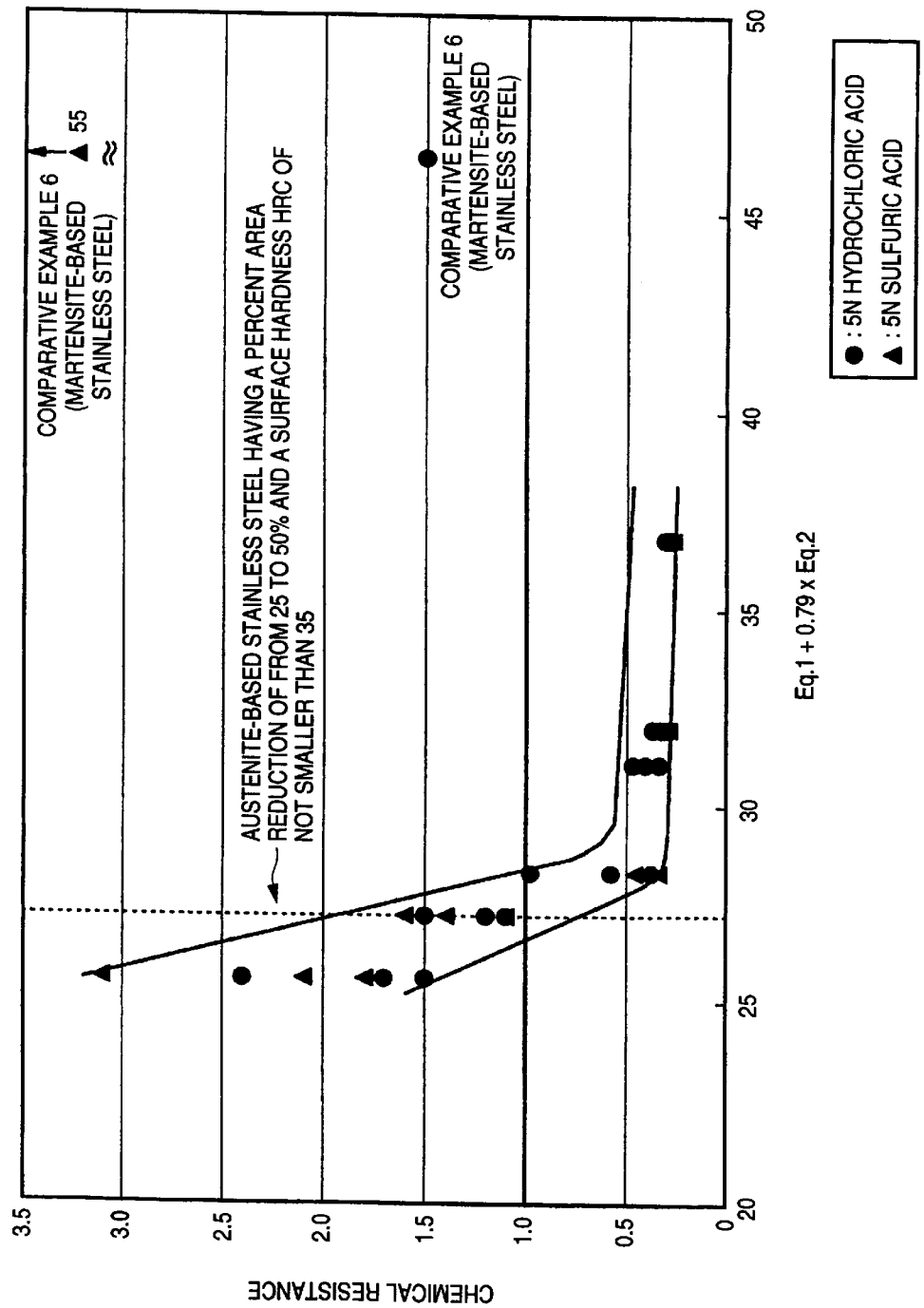
FIG. 4 is a graph illustrating the relationship between the value of the left side of the relationship (2) and chemical resistance.

The test results are shown in FIG. 4 and Table 2. The numeral value in FIG. 4 and Table 2 is represented relative to the corrosion rate of Comparative Example 1 as 1. As can be seen in FIG. 4, when the value of the left side of the relationship (2) (Eq. 1+0.79×Eq. 2) is equal or more than 27.0, the test specimen exhibits an excellent chemical resistance and thus shows a small degree of drop of chemical resistance by reduction working.

As mentioned above, when an austenite-based stainless steel having the formulation satisfying the foregoing conditions (various relationships and equations) is subjected to reduction working for work-hardening to have a surface hardness HRC of equal or more than 35, both excellent corrosion resistance and durability can be attained.

[Second Embodiment]

In the rolling bearing 1 of the first embodiment, cold working is effected to cause hardening so that a surface hardness HRC of equal or more than 35 is obtained. It is preferred that hardening by cold working be followed by carbonitriding by which a surface hard layer having a high hardness is formed.

The inventors made extensive studies. As a result, it was found that by effecting a predetermined cold working at the step of working an austenite-based stainless steel into a predetermined shape to form constituent members of rolling bearing device (external member, internal member, and rolling element), and then subjecting these constituent members to carbonitriding at a temperature as low as about 400° C. to 540° C., the surface hardness Hv of the constituent members can be enhanced to a range of from 650 to 1,050, making it possible to drastically enhance the durability thereof.

When subjected to cold working attaining a percent area reduction of from 10% to 60%, an austenite-based stainless steel comprises a considerable amount of dislocation introduced thereinto. When such an austenite-based stainless steel is subjected to carbonitriding as mentioned above, carbon penetrates into the lattice of austenite to make solid solution strengthening. In addition, an effect such as strain aging involving the fixing of the foregoing dislocation by carbon acts to enhance the surface hardness.

A rolling bearing device comprising an external member, an internal member and rolling elements at least one of which has a surface hardness as mentioned above exhibits an extremely high surface hardness and hence an excellent durability. Further, since this rolling bearing device is formed by an austenite-based stainless steel, it exhibits an excellent corrosion resistance and can be used also in usage requiring non-magnetic properties.

As the base metal constituting at least one of the foregoing external member, internal member and rolling element there is used an austenite-based stainless steel as previously mentioned. Specific examples of such an austenite-based stainless steel include SUS303, SUS304, SUS316, SUS316L, and SUS317.

However, SUS303 comprises a large amount of S incorporated therein to have a good scrapability and thus exhibits deteriorated corrosion resistance as compared with other austenite-based stainless steels. Further, since S acts to deteriorate carburizability, SUS303 can hardly be provided with a sufficient hardness even when subjected to carburizing. For this reason, the content of S in the austenite-based stainless steel is preferably equal or less than 0.030%.

Further, an austenite-based stainless steel such as SUS303 and SUS304 is subject to transformation of austenite to induced martensite when subjected to cold working. Therefore, when such an austenite-based stainless steel is subjected to intense plastication, the resulting excessive induced transformation can cause the production of martensite structure that deteriorates corrosion resistance.

Accordingly, the accomplishment of both durability and corrosion resistance, which is an object of the invention, cannot be occasionally made.

Moreover, when a martensite structure is produced, martensite deteriorates carburizability to cause uneven carburizing or makes it difficult to apply the austenite-based stainless steel to usage requiring non-magnetic properties, which is an object of the invention. In order to inhibit such a trouble, an austenite-based stainless steel having the formulation satisfying the foregoing relationship (2) is preferably used.

Specifically, SUS316 is preferred. More preferably, SUS36L and SUS317 are used. Even more preferably, an austenite-based stainless steel arranged such that the value of the left side of the foregoing relationship (2) is equal or more than 28.0 is used. However, when a large amount of the foregoing alloy components such as Ni and Cr are added, there shows a remarkable rise of cost (the value of the left side of the foregoing relationship (2) increases). Accordingly, the value of the left side of the foregoing relationship (2) is preferably equal or less than 47.1.

The process for the preparation of the rolling bearing device of the present embodiment will be further described hereinafter.

Figure 5:
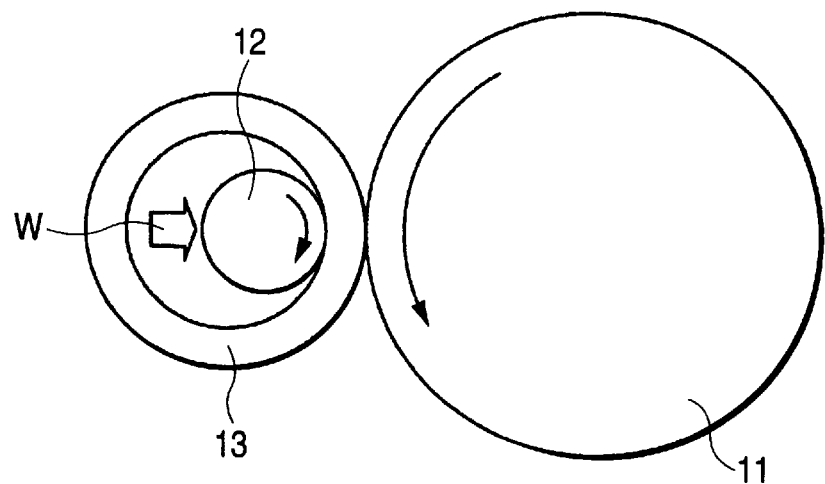
FIG. 5 is a schematic diagram illustrating the method of CRF working.

In some detail, the foregoing austenite-based stainless steel is subjected to rough working by cold working so that it is formed into a desired shape. Rough working by cold working will be described herein with reference to rolling bearing. A roughly-formed ring is prepared from a steel pipe or steel rod. The roughly-formed ring thus prepared is then subjected to cold rolling working (hereinafter referred to as "CRF working"). In this CRF working, as shown in the schematic view of FIG. 5, the roughly-formed ring 13 is rolled under a load W while being clamped between a forming roll 11 and a mandrel 12 to reduce the thickness thereof and increase the diameter thereof. In accordance with this working, less scraping margin is required than by directly cutting a steel rod into a ring, making it possible to give a very high yield of material. CRF working may be followed by sizing for the purpose of enhancing the roundness of the ring.

The foregoing description has been made with reference to rolling bearing. In the case where the rolling bearing device is a ball thread or linear guide, the constituent members are formed by drawing, rolling or the like. In this manner, the resulting yield of material is very good as compared with cutting as in the case of rolling bearing.

In general, high carbon chromium bearing steel, martensite-based stainless steel, etc. are subjected to CRF working followed by rough cutting, hardening, tempering and finally cutting. However, the present embodiment requires no hardening. Therefore, the stainless steel which has been subjected to CRF working may be directly subjected to finish cutting. This makes it possible to drastically reduce the required number of steps. If necessary, the stainless steel may be further subjected to super finish working.

When subjected to excessive intense working during cold working, even the foregoing austenite-based stainless steel undergoes induced transformation to martensite that causes deterioration of corrosion resistance or enhances magnetizability, occasionally making it impossible to accomplish the object of the invention. Further, if these phenomena are remarkable, the carburizability described later can be deteriorated or uneven carburizing can occur during carburizing.

On the other hand, when cold working is insufficient, the strain introduced into the base metal is insufficient, lowering the hardness of the base metal and the carburized hard layer formed on the surface of the finished product.

Accordingly, cold working is preferably effected such that the resulting percent area reduction reaches 10% to 60%. In order to cause the foregoing defects to occur more hardly, cold working is preferably effected such that the resulting percent area reduction reaches 20% to 50%.

Cold working is followed by finish working. This finish working may be preceded by tempering for the purpose of removing somewhat the residual stress developed by cold working. The tempering conditions are preferably such that the hardness does not drop. For example, temperature is preferably effected at a temperature of from about 300° C. to 500° C. for 1 to 2 hours.

The carburizing method to be effected in the present embodiment will be described hereinafter.

In general, an austenite-based stainless steel has a Cr-rich oxide layer (normally referred to as "passive layer"; hereinafter referred to as "Cr oxide layer") formed on the surface thereof. Since this Cr oxide layer inhibits carburizing, the austenite-based stainless steel cannot be effectively subjected to carburizing. The employment of a method such as plasma carburizing utilizing discharge allows carburizing after fashion. However, this method cannot make the use of martensite transformation that improves non-magnetic properties and corrosion resistance. Accordingly, there is normally no effective method other than a method which comprises carburizing at a temperature of equal or more than 800° C. to cause a considerable amount of carbide, carbonitride or the like to be deposited as a surface layer and cause hardening.

However, this method is disadvantageous in that Cr, which has a strong affinity for carbon, is deposited in the form of carbide, deteriorating non-magnetic properties or corrosion resistance. Further, since this method involves the use of discharge, it is disadvantageous in that it has an insufficient mass-producibility. In addition, product quality widely varies with product shape. Further, products having complicated shape can difficultly form a uniform carburized layer thereon.

In order to solve the foregoing problems, the carburizing method in the present embodiment is accomplished by the following method.

In order to remove the foregoing Cr oxide layer, fluorination is effected as a pre-treatment step. In this fluorination process, the material is heated to and held at a temperature of from about 200° C. to 400° C. in an atmosphere comprising a mixture of fluorine-based gas such as $NF_3$ (nitrogen trifluoride) and nitrogen gas. Cr oxide layer, which inhibits carburizing, changes to a fluoride layer and thus is extremely activated, allowing subsequent carburizing.

Referring to carburizing method, the material is heated to and held at a temperature of from 460° C. to 520° C. in an atmosphere of RX gas, singly or in admixture with $CO_2$ or in an atmosphere of unsaturated hydrocarbon gas such as acetylene and ethylene at a pressure of equal or less than 133 Pa.

The carburizing with RX gas is accompanied by the oxidation of Fe by $CO_2$ gas that causes the formation of a black oxide layer composed of $Fe_3O_4$ on the carburized hard layer and thus impairs the external appearance, corrosion resistance, etc. of the product. Therefore, the stainless steel thus carburized is preferably subjected to washing with acid or the like to remove the oxide layer. The treatment to be used in washing with acid is not specifically limited. In practice, however, hydrofluoric acid, nitric acid, hydrochloric acid, sulfuric acid or mixture thereof may be used.

In accordance with the carburizing with unsaturated hydrocarbon gas, the formation of oxide layer can be inhibited. Thus, the material thus carburized may be subjected to soft blasting at maximum. This method can also prevent sooting, which inhibits carburizing, and thus is more desirable.

When the carburizing temperature exceeds 540° C., carbon combines to Cr in the steel to form Cr carbide, etc., making it more likely that the permeability or corrosion resistance can be deteriorated. Further, the dimensional change increases. When the carburizing temperature is equal or less than 540° C., carbon which has penetrated into the structure during carburizing becomes carbide which is not deposited. Thus, the carbide makes solid solution and penetrates into the face-centered cubic lattice of austenite, strengthening the structure by solid solution and fixing dislocation to cause hardening. As a result, a high toughness surface hard layer having substantially little carbide present therein can be formed.

On the contrary, when the carburizing temperature falls below 400° C., a carburized hard layer having a sufficient depth can hardly be obtained. For this reason, the carburizing temperature is preferably from 400° C. to 540° C. In order to cause the foregoing defects to occur more difficultly, the carburizing temperature is more preferably from 460° C. to 520° C.

In accordance with the preparation process of the present embodiment, the dimensional change is negligibly small. Thus, the product thus carburized can be used directly as a finished product. However, the product thus obtained may be subjected to superfinish on the raceway or rolling surface thereof.

When subjected to the foregoing treatment, the constituent members of rolling bearing device can be provided with stable surface hardness and core hardness. Thus, the rolling bearing device of the present embodiment exhibits excellent corrosion resistance and durability and can be used in usage requiring non-magnetic properties. Accordingly, the rolling bearing device of the present embodiment can be used in usage requiring non-magnetic properties as in semiconductor producing apparatus, liquid crystal producing apparatus, apparatus using electron rays, medical inspection apparatus and linear motor car and in usage requiring corrosion resistance as in liquid crystal/semiconductor producing facilities and food machine to advantage.

In order to secure sufficient durability, the surface hardness Hv (hardness of carburized hard layer) needs to be equal or more than 650. In order to secure better durability, the surface hardness Hv is preferably equal or more than 800.

When the thickness of the carburized hard layer is small, sufficient durability cannot be secured. On the contrary, when the thickness of the carburized hard layer is too great, the required carburizing time increases, adding to cost. Further, unallowable dimensional change or deformation can occur. From these standpoints of view, the thickness of the carburized hard layer is preferably from about 10 $\mu$m to 50 $\mu$m. In order to secure better durability, the hardness Hv of the depth corresponding to 2% of the diameter of the rolling bearing is preferably equal or more than 250, more preferably equal or more than 300.

Even in usage requiring non-magnetic properties, the constituent members which are not driven by rotation or the like do not need to be formed by the foregoing austenite-based stainless steel and thus may be formed by martensite-based stainless steel, not to mention ordinary bearing steel such as SUJ2.

Further, when the rolling element is formed by ceramic such as silicon nitride, zirconia, alumina and silicon carbide, the friction and abrasion of the rolling element with the external member or internal member can be lessened to improve durability in particular.

Figure 6:
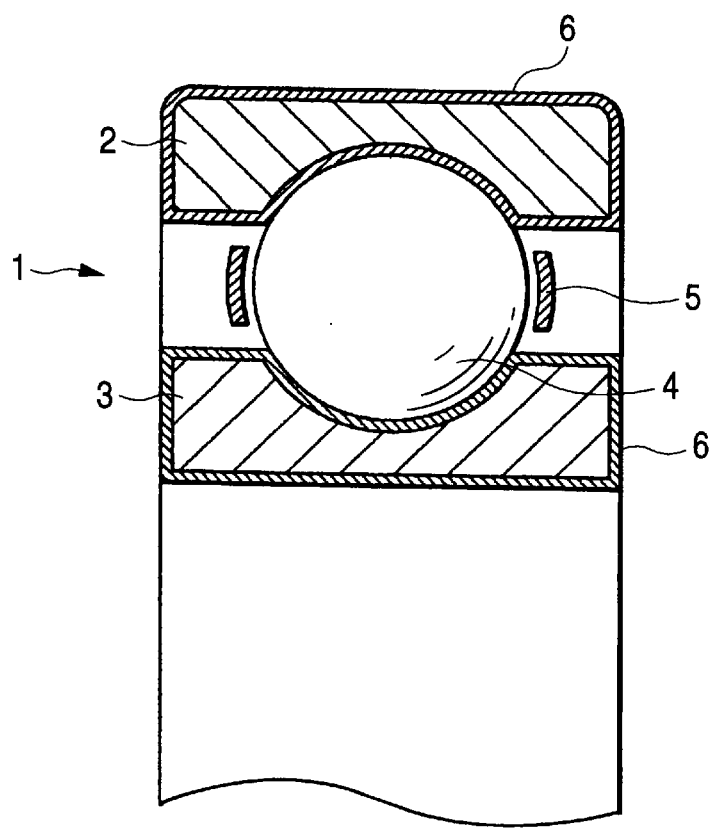
FIG. 6 is a partial vertical sectional view of a rolling bearing which is a second embodiment of the rolling bearing device according to the invention.

A specific example of the rolling bearing device as mentioned above will be described in connection with the attached drawings. FIG. 6 is a partial vertical sectional view of a rolling bearing of the second embodiment of the rolling bearing device according to the invention. Like numerals are used for like components in FIGS. 1 and 6.

The rolling bearing 1 of the second embodiment (ball baring produced by NSK, LTD.; JIS Designation No. 6006) comprises an outer ring 2, an inner ring 3, a plurality of rolling elements 4 rollably provided interposed between the outer ring 2 and the inner ring 3, and a retainer 5 for equally retaining the rolling elements 4. The inner ring 2 and the outer ring 3 are produced by subjecting an austenite-based stainless steel to cold working. The rolling element 4 is formed by silicon nitride, and the retainer 5 is formed by a fluororesin. Further, the outer ring 2 and the inner ring 3 each comprise a hard carburized hard layer 6 provided on the surface thereof.

The outer ring 2 and inner ring 3 of the rolling bearing 1 were then evaluated for durability, corrosion resistance, etc. with different kinds of stainless steel, percentage of area reduction developed by cold working and surface hardnesses (Examples 11 to 20 and Comparative Examples 9 to 16).

As the stainless steels there were used those wherein the value of the left side of the foregoing relationship (2), Eq. 1 and Eq. 2 are as set forth in Tables 3 and 4.

The stainless steel used in the rolling bearings of Examples 11 to 20 and Comparative Examples 11, 12, 15 and 16 was an austenite-based stainless steel satisfying the conditions of the foregoing relationship (2), and the stainless steel used in the rolling bearings of Comparative Examples 9 and 10 was an austenite-based stainless steel which does not satisfy the same conditions. The stainless steel used in the rolling bearing of Comparative Example 13 was a martensite-based stainless steel (SUS440C), and the stainless steel used in the rolling bearing of Comparative Example 14 was Mn—Cr—V-based non-magnetic steel (YHHD50, produced by Hitachi Metals, Ltd.).

TABLE 3

| Example No. | Kind of steel | Eq. 1[2) | Eq. 2[3) | Value of left side of relationship (2) | % Area reduction | Heat treatment conditions | Surface hardness (Hv) | Hardness of base metal (Hv) | Torque life (rotation[4)) | Corrosion resistance | Permeability |
|---|---|---|---|---|---|---|---|---|---|---|---|
| Example 11 | SUS304 | 11.6 | 19.8 | 27.2 | 10 | A | 650 | 250 | 1.8 | G | G |
| Example 12 | SUS316 | 12.3 | 20.5 | 28.5 | 15 | A | 767 | 300 | 2.0 | G | G |

TABLE 3-continued

| Example No. | Kind of steel | Eq. 1[2] | Eq. 2[3] | Value of left side of relationship (2) | % Area reduction | Heat treatment conditions | Surface hardness (Hv) | Hardness of base metal (Hv) | Torque life (rotation[4]) | Corrosion resistance | Permeability |
|---|---|---|---|---|---|---|---|---|---|---|---|
| Example 13 | SU3316 | 12.3 | 20.5 | 28.5 | 25 | B | 866 | 315 | 2.0 | G | G |
| Example 14 | SUS316 | 12.3 | 20.5 | 28.5 | 36 | B | 897 | 365 | 2.0 | G | G |
| Example 15 | SUS316L | 13.7 | 20.4 | 29.8 | 38 | A | 915 | 352 | 2.0 | G | G |
| Example 16 | SUS316L | 13.7 | 20.4 | 29.8 | 50 | A | 937 | 378 | 2.0 | G | G |
| Example 17 | SUS316L | 13.7 | 20.4 | 29.8 | 60 | A | 903 | 396 | 2.0 | G | G |
| Example 18 | SUS316L | 13.7 | 20.4 | 29.8 | 38 | B | 1025 | 352 | 2.0 | G | G |
| Example 19 | SUS316L | 13.7 | 20.4 | 29.8 | 50 | B | 1050 | 378 | 2.0 | G | G |
| Example 20 | SUS316L | 13.7 | 20.4 | 29.8 | 60 | B | 978 | 396 | 2.0 | G | G |

[1] Eq. 1 + 0.79 × Eq. 2
[2] Eq. 1 = Ni% + 0.5 × Mn% + 0.3 × Cu% + 25 × N% + 30 × C%
[3] Eq. 2 = Cr% + 2 × Si% + 1.5 × Mo%
[4] × $10^7$

TABLE 4

| Example No. | Kind of steel | Eq. 1[2] | Eq. 2[3] | Value of left side of relationship (2) | % Area reduction | Heat treatment conditions | Surface hardness (Hv) | Hardness of base metal (Hv) | Torque life (rotation[4]) | Corrosion resistance | Permeability |
|---|---|---|---|---|---|---|---|---|---|---|---|
| Comparative Example 9 | SUS304 | 10.7 | 18.9 | 25.6 | 32 | A | 559 | 370 | 0.67 | F | 1.24 |
| Comparative Example 10 | SUS304 | 10.7 | 18.9 | 25.6 | 0 | A | 638 | 187 | 0.69 | G | G |
| Comparative Example 11 | SUS304 | 11.6 | 19.8 | 27.2 | 70 | A | 532 | 455 | 0.63 | F | 1.89 |
| Comparative Example 12 | SUS316 | 12.3 | 20.5 | 28.5 | 70 | A | 624 | 437 | 0.70 | G | 1.43 |
| Comparative Example 13 | SUS440C | — | — | — | — | C | 706 | — | 2.0 | P | — |
| Comparative Example 14 | YHD50 | — | — | — | — | D | 444 | — | 0.58 | P | G |
| Comparative Example 15 | SUS304 | 10.7 | 18.9 | 25.6 | 0 | None | 187 | — | 0.07 | G | G |
| Comparative Example 16 | SUS316 | 12.3 | 20.5 | 28.5 | 0 | None | 178 | — | 0.06 | G | G |

[1] Eq. 1 + 0.79 × Eq. 2
[2] Eq. 1 = Ni% + 0.5 × Mn% + 0.3 × Cu% + 25 × N% + 30 × C%
[3] Eq. 2 = Cr% + 2 × Si% + 1.5 × Mo%
[4] × $10^7$

The process for the preparation of an outer ring and an inner ring from a stainless steel will be described hereinafter. In some detail, a ring-shaped member of stainless steel was subjected to CRF working attaining a percent area reduction set forth in Tables 3 and 4 to prepare a roughly-formed ring. For the determination of percent area reduction, the vertical section area of the ring was measured by image analysis. The measurements were then substituted in the foregoing definition equation (1) for percent area reduction.

Figure 7B:
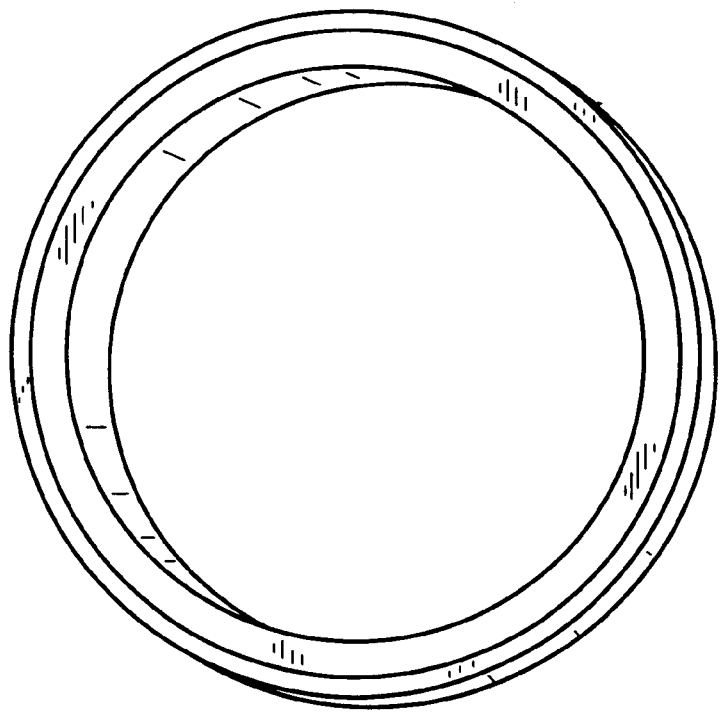
FIGS. 7A and 7B are diagrams illustrating the shape of ring-shaped member and roughly-formed ring.
Figure 7A:
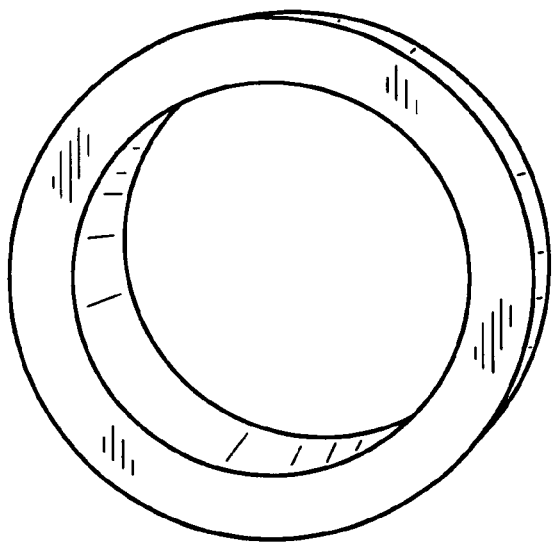

The foregoing CRF working and measurement of vertical section area will be further described with reference to an example. FIG. 7A is a perspective view of the ring-shaped member made of steel of Example 15. FIG. 7B is a perspective view of the roughly-formed ring (outer ring) obtained by subjecting the ring-shaped member to CRF working attaining a percent area reduction of 38%.

Most of the roughly-formed ring which has been subjected to CRF working then has a raceway groove formed on the inner circumferential surface thereof and a chamfer formed between the outer circumference and the side face and thus has a complicated sectional shape.

Since the ring-shaped member which has not been subjected to CRF working has a relatively simple sectional shape, the section area of the member can be calculated by measurement of size. However, the roughly-formed ring which has been subjected to CRF working has a complicated sectional shape as mentioned above, the section area of the member is preferably measured by image analysis.

Accordingly, the measurement of the section area of the ring-shaped member and the roughly-shaped ring were effected as follows. In some detail, the ring-shaped member and the roughly-formed ring were each cut, embedded in a resin, and then measured for section area by means of an optical image analyzer in the same manner. The optical image analyzer then perform automatic operation to determine percent area reduction.

Subsequently, the roughly-formed ring was subjected to finish cutting, and then subjected to heat treatment under the conditions A to D described later. Those which had been subjected to heat treatment under the conditions A and B were then subjected to washing with acid to thoroughly remove a black oxide layer from the surface thereof.

Heat treatment condition A: The material is kept at a temperature of from 260° C. to 350° C. in a nitrogen gas mixed with 10% of nitrogen trifluoride for 20 to 30 minutes, and then kept at a temperature of from 460° C. to 520° C. in an atmosphere of carburizing gas (mixture of RX and $CO_2$) for 20 to 30 hours.

Heat treatment condition B: The material is kept at a temperature of from 260° C. to 350° C. in a nitrogen gas mixed with 10% of nitrogen trifluoride for 20 to 30 minutes. Then, the material is kept at a temperature of from 460° C. to 520° C. under a pressure of 39.9 Pa while the atmosphere being mixed with acetylene gas for 20 to 30 hours.

This carburizing process causes a carburized hard layer 6 to be formed on the surface of the outer ring 2 and the inner ring 3. The section of the outer ring 2 and the inner ring 3 were each etched with a marble reagent, and then observed under microscope. As a result, the carburized hard layer 6 was found to have a thickness of from about 20 μm to 30 μm.

The stain steel of Comparative Example 13 was subjected to rough cutting, kept at a temperature of from 1,030° C. to 1,070° C. for 30 minutes, and then cooled with nitrogen gas to undergo hardening. The stainless steel thus hardened was kept at a temperature of from 160° C. to 180° C. for 2 hours to undergo tempering (heat treatment condition C), and then subjected to finish cutting.

The stain steel of Comparative Example 14 was subjected to rough cutting, kept at a temperature of from 680° C. to 740° C. for 5 hours to undergo aging (heat treatment condition D), and then subjected to finish cutting.

The outer ring 2 and inner ring 3 thus produced were each then measured for surface hardness and core hardness (hardness at the depth corresponding to 2% of the diameter Da of the rolling element 4 (about 140 μm in the case of the present embodiment), which indicates the hardness of the base metal). For the measurement of hardness, a Vickers hardness meter was used. The load under which the surface hardness is measured was 0.98 N, and the load under which the core hardness is measured was 0.8 N. The results are set forth in Tables 3 and 4.

The rolling bearings of Examples 11 to 20 and Comparative Examples 9 to 16 thus produced were each then evaluated for durability, corrosion resistance and permeability.

For the evaluation of durability, torque life was used. In some detail, the test specimen was subjected to rotary test at a rotary speed of 500 $min^{-1}$ and an axial load of 294 N under a pressure of $1.3 \times 10^{-5}$ Pa. The time at which torque reaches twice the initial torque is defined to be torque life. The rotary test was suspended when the number of rotations reached $2 \times 10^7$.

For the evaluation of corrosion resistance, almost the same salt spray test as effected in the first embodiment was effected. In some detail, those showing no rusting, some but relatively light rusting and remarkable rusting after 1 week of salt spray were represented by the symbols G (good), F (fair) and P (poor), respectively. The results are set forth in Tables 3 and 4.

For the measurement of permeability, a Type LP-141 permeability measuring meter (produced by DENSHIJIKI INDUSTRY CO., LTD.) was used. In some detail, measurement was made with the probe being in perpendicular contact with the outer circumference of the outer ring 2. The results are set forth in Tables 3 and 4. Those showing a permeability of equal or less than 1.1 are represented by G (good). For those showing a permeability of greater than 1.1, the measured value is given. Since Comparative Example 13 used SUS440C, which is a ferromagnetic material, the measurement of permeability was not made.

All the materials of Examples 11 to 20 exhibit a surface hardness Hv as high as equal or more than 650 and a base metal hardness Hv as high as equal or more than 250 and thus exhibit an extremely good durability. These materials also exhibit an excellent corrosion resistance and a permeability of equal or less than 1.1.

On the contrary, Comparative Example 9, which comprises an austenite-based stainless steel which does not satisfy the conditions of the foregoing relationship (2), underwent excessive induced transformation when subjected to CRF working and thus could not be provided with sufficient hardness when subjected to carburizing. Thus, Comparative Example 9 exhibited a deteriorated durability. Comparative Example 9 also left something to be desired in corrosion resistance and permeability.

Comparative Example 10 was not subjected to CRF working. Thus, Comparative Example 10 could not introduce strain therein when subjected to cold working. Accordingly, Comparative Example 10 had a lower surface hardness and base metal hardness and lower durability than Examples 11 to 20.

Comparative Examples 11 and 12 were subjected to cold working attaining a percent area reduction as excessive as 70%. Thus, Comparative Examples 11 and 12 underwent excessive induced transformation and could not be provided with sufficient hardness when subjected to carburizing similarly to Comparative Example 9. Accordingly, Comparative Examples 11 and 12 left something to be desired in durability, corrosion resistance and permeability.

Comparative Example 13 was formed by a conventional martensite-based stainless steel, and Comparative Example 14 was formed by a conventional non-magnetic steel. Both the two comparative examples were inferior to Examples 11 to 20 in corrosion resistance.

Comparative Examples 15 and 16 were subjected to neither cold working nor carburizing. Thus, Comparative Examples 15 and 16 were so extremely soft that they ended their life early. These materials could not be used.

These results are shown graphically in FIGS. 8 and 9. FIG. 8 illustrates the relationship between the percent area reduction attained by CRF working and the surface hardness attained by carburizing. FIG. 9 illustrates the relationship between the percent area reduction attained by CRF working and the hardness of the base metal (hardness at the depth corresponding to 2% of the diameter Da of rolling element).

As can be seen in the graph of FIG. 8, the greater the percent area reduction is, the greater is the surface hardness. This is because as the percent area reduction increases, more strain is introduced. Accordingly, carbon which penetrates into the structure during carburizing makes solid solution strengthening. In addition, an effect such as strain aging involving the fixing of strain by carbon acts to enhance surface hardness. As can be seen in FIG. 9, the greater the percent area reduction is, the higher is the hardness of the base metal developed by work hardening. Accordingly, the greater the percent area reduction is, the higher is durability.

However, when the percent area reduction exceeds 60%, excessive induced transformation occurs. Under these conditions, the carburizability tends to be deteriorated and the surface hardness tends to be lowered. This causes the deterioration of corrosion resistance and permeability. These results show that the percent area reduction is preferably from 10% to 60%.

The foregoing first and second embodiments are mere embodiments of the invention. The present invention is not limited to these embodiments.

For example, while the foregoing embodiments have been described with reference to the case where the rolling bearing device is a deep-groove ball bearing, the rolling bearing device of the invention can be applied to other various kinds of rolling bearing devices. Examples of these rolling bearing devices include radial rolling bearing such as angular ball bearing, cylindrical roller bearing, tapered roller bearing, needle roller bearing and self-aligning roller bearing, and thrust: rolling bearing such as thrust ball bearing and thrust roller bearing.

For example, while the foregoing embodiments have been described with reference to the case where the rolling bearing device is a rolling bearing, the rolling bearing device of the invention can be applied to other various kinds of rolling bearing devices such as linear guide, ball thread and direct-acting bearing.

As mentioned above, in the rolling bearing device according to the invention, at least one the external member and internal member constituting the rolling bearing device is formed by an austenite-based stainless steel and is subjected to plastication attaining a percent area reduction of equal or more than 25% to have a surface hardness HRC of equal or more than 35. Thus, the rolling bearing device of the invention is excellent in both durability and corrosion resistance.

What is claimed is:

1. A rolling bearing device comprising:
   an external member;
   an internal member; and
   a plurality of rolling elements rollably provided interposed between said external member and said internal member,
   wherein at least one of said external member and said internal member is formed by an austenite-based stainless steel and has a surface hardness Hv of a range of from 650 to 1,050 at a raceway groove, which rollably contacts with said plurality of rolling elements.

2. A method for manufacturing at least one of the external member and internal member according to claim 1, the method comprising:
   subjecting at least one of the external member and internal member to plastication by cold working attaining a percent area reduction of from 10% to 60%;
   removing an oxide layer on the surface of at least one of the external member and internal member; and
   subjecting at least one of the external member and internal member to carbonitriding at a temperature of from 400° C. to 540° C. in an atmosphere of carburizing gas.

3. The method according to claim 2, wherein the temperature for the carbonitriding is a range of from 460° C. to 520° C.

4. The method according to claim 2, wherein the percent area reduction is a range of from 20 to 50%.

5. The method according to claim 2, wherein the oxide layer removing process is fluorination process.

6. The method according to claim 2, wherein the carburizing is performed in an atmosphere of unsaturated hydrocarbon gas at a pressure of equal or less than 133 Pa.

7. The rolling bearing device according to claim 1, wherein the hardness Hv of the depth corresponding to 2% of the diameter of the rolling element from the surface of the raceway groove is equal or more than 250.

8. The rolling bearing device according to claim 1, wherein the content of S (sulfur) in the austenite-based stainless steel is equal or less than 0.030%.

9. The rolling bearing device according to claim 1, wherein the content of S (sulfur) in the austenite-based stainless steel is equal or less than 0.030%.

10. The rolling bearing device according to claim 1, wherein said rolling bearing device satisfies the following equation:

$$\text{Eq. 1} + 0.79 \times \text{Eq. 2} \geq 27.0$$

wherein Eq. 1 and Eq. 2 are defined by the following equations, respectively, $$\text{Eq. 1} = \text{Ni \%} + 0.5 \times \text{Mn \%} + 0.3 \times \text{Cu \%} + 25 \times \text{N \%} + 30 \times \text{C \%}$$

$$\text{Eq. 2} = \text{Cr \%} + 2 \times \text{Si \%} + 1.5 \times \text{Mo \%},$$

and wherein Ni % means % Ni by mass, Mn % means % Mn by mass, Cu % means % Cu by mass, N % means % N by mass, C % means % C by mass, Cr % means % Cr by mass, Si % means % Si by mass, and Mo % means % Mo by mass.

11. A rolling bearing device comprising:
    an external member;
    an internal member; and
    a plurality of rolling elements rollably provided interposed between said external member and said internal member,
    wherein at least one of said external member and said internal member is formed by an austenite-based stainless steel and has a surface hardness HRC of equal or more than 35 at a raceway groove, which rollably contacts with said plurality of rolling elements, formed by plastication that attains a percent area reduction of equal or more than 25%.

12. The rolling bearing device according to claim 1, wherein said rolling bearing device satisfies the following equation:

$$\text{Eq. 1} + 0.79 \times \text{Eq. 2} \geq 27.0$$

wherein Eq. 1 and Eq. 2 are defined by the following equations, respectively, $$\text{Eq. 1} = \text{Ni \%} + 0.5 \times \text{Mn \%} + 0.3 \times \text{Cu \%} + 25 \times \text{N \%} + 30 \times \text{C \%}$$

$$\text{Eq. 2} = \text{Cr \%} + 2 \times \text{Si \%} + 1.5 \times \text{Mo \%},$$

and wherein Ni % means % Ni by mass, Mn % means % Mn by mass, Cu % means % Cu by mass, N % means % N by mass, C % means % C by mass, Cr % means % Cr by mass, Si % means % Si by mass, and Mo % means % Mo by mass.

* * * * *